Sept. 1, 1953 T. A. COLLITO 2,650,801
HEAT EXCHANGER
Filed Oct. 11, 1949
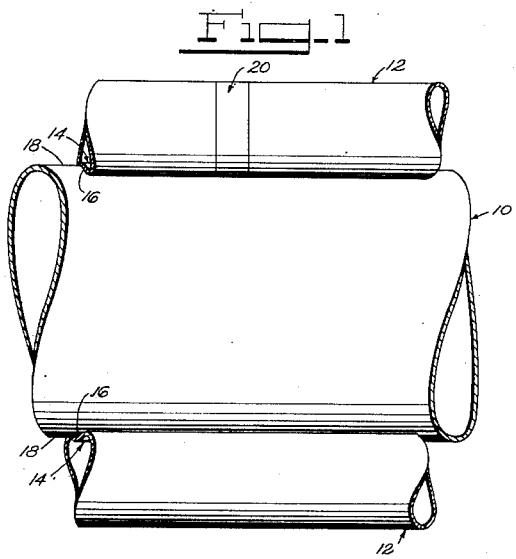
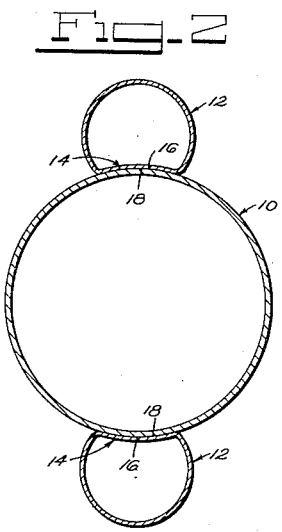
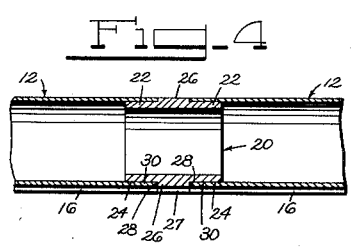
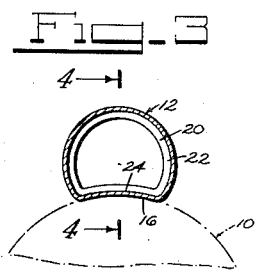
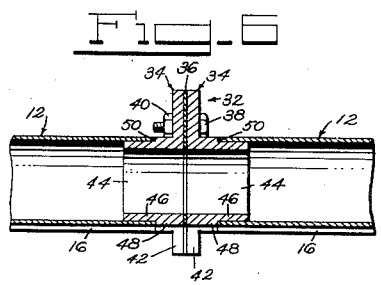
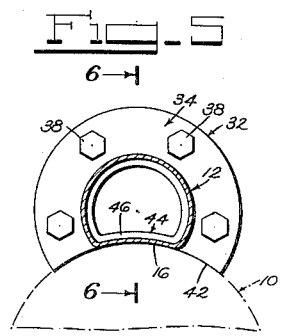
INVENTOR.
THOMAS A. COLLITO
BY Edwin Levisohn +
Harry Cohn
ATTORNEYS Patented Sept. 1, 1953

2,650,801

UNITED STATES PATENT OFFICE 2,650,801

HEAT EXCHANGER

Thomas A. Collito, Newark, N. J.; Michael B. Collito, executor of said Thomas A. Collito, deceased Application October 11, 1949, Serial No. 120,640

3 Claims. (Cl. 257—241)

This invention relates to apparatus for maintaining the contents of a process line or conduit at a predetermined temperature or within a desired range of temperatures.

In the processing or handling of many products, such as, for example, beer, ice cream, milk, chemicals, paraffin, fruit juices, etc., the product generally travels between separate parts of a plant through a circular conduit-pipe or process line and, during such travel, it is necessary to maintain the product at a predetermined temperature in said conduit. Paraffin is an extremely difficult product to handle in this manner due to its characteristic of "freezing" immediately in the absence of heat, nevertheless, it is necessary, in many plants, to conduct paraffin through conduits extending from a tank or container to the apparatus in which it is used in the manufacturing process, for example, a machine for coating paper cups with paraffin. Heretofore, the product conduits or process lines were usually jacketed but this proved to be both expensive and impracticable, or, in the case of low temperature work where it is an ever present necessity to keep the line cold, it has been the practice to provide refrigerant "bleeders" to maintain the extremely low suction temperature present in these lines, this practice requiring an elaborate injection system with its attendant expansion valves and other specialized equipment. Therefore, the primary object of this invention is the provision of simplified, efficient and inexpensive apparatus for controlling the temperature of a product in transit through a process line.

Another object is to provide a temperature-control conduit for the usual circular pipe.

The above and other objects, features and advantages of the invention will be fully understood from the following description, considered in connection with the accompanying illustrative drawings.

In the drawings:

Fig. 1 is a side view of a process line provided with temperature-control conduits according to the invention;

Fig. 2 is a sectional view of the apparatus of Fig. 1;

Fig. 3 is a transverse sectional view of a temperature-control conduit provided with one form of coupling means;

Fig. 4 is a sectional view taken on line 4—4 of Fig. 3;

Fig. 5 is a view similar to Fig. 3 showing another form of coupling means; and

Fig. 6 is a sectional view taken on line 6—6 of Fig. 5.

Referring now to the drawings in detail, there is shown the usually metallic circular pipe conduit or process line 10 through which there customarily flows a product such as, for example and not by way of limitation, a chemical, paraffin, fruit juices, ice cream, milk, beer, etc., which product must be maintained at a predetermined temperature or within a temperature range during transit through said line.

To provide for the transfer of heat to, or for the withdrawal of heat from the contents of pipe 10, a companion non-circular temperature-control or heat exchange conduit 12 is disposed in direct heat exchange relation with said pipe. Conduit 12 may be formed of any suitable metal, such as, for example and not by way of limitation, copper, Monel metal, stainless steel, or any alloy, the choice of material depending upon the direction of heat exchange and the medium carried by said conduit. It will be understood that said companion conduit may be provided, in any suitable manner, with any suitable heat exchange medium which may comprise a heating or a cooling agent, such as, for example and not by way of limitation, steam, hot water for heating, and brine, ammonia, or other refrigerant for cooling.

To provide a maximum surface area to effect the direct exchange of heat between pipe 10 and the companion conduit 12, the latter is provided, in any suitable manner, with a non-circular peripheral contour. As here shown, conduit 12, which may be otherwise of any desired cross-sectional contour, is provided with a re-entrant arcuate heat exchange portion 14 extending longitudinally thereof. It will be noted that said portion 14 is provided with a concave outer surface 16 which is generally complementary to the outer surface of pipe 10, but it will be understood that the curvature of surface 16 need not be the same as the curvature of the surface portion 18 of pipe 10 which it abuts and with which it is in heat exchange disposition.

As illustrated in Fig. 1, it will be noted that the companion conduit 12 is mounted longitudinally of pipe 10, the concave surface portion 16 of the former abutting a surface portion 18 of the latter in direct heat exchange relation therewith. It will be understood that a heating medium in said companion conduit will cause the transfer of heat through the arcuate portion 14 thereof to the abutting portion 18 of pipe 10 thereby heating the contents of the latter. In the same manner, a cooling medium contained in said companion conduit will cause the transfer of heat from the contents of the pipe, through a portion 18 thereof, and through the arcuate portion 14 into the cooling medium.

Where one companion conduit 12 is insufficient to maintain the contents of the pipe at a required temperature, a plurality of conduits may be disposed in heat exchange relation with the pipe, as illustrated in Fig. 1. It will be understood that said conduits may be secured to the pipe in any suitable manner, said securement per se not constituting a part of this invention.

The conduits 12 may be provided in any suitable lengths. However, where it is necessary to join two sections of conduit, there is provided a coupling member or nipple 20, preferably formed of a suitable metal. Said coupling member is similar in cross section to the conduit 12, having the sleeve portions 22, 22 provided with the concave outer surface portions 24, 24 (Fig. 3), and the integral centrally raised portion 26 extending between said sleeve portions and provided with the outer concave surface portion 27, the marginal edges of said raised portion forming the peripherally continuous shoulders 28, 28 which limit the insertion of the coupling member into the conduit. When mounted in adjacent ends 30 of sections of conduit 12, each sleeve portion extends into one of said ends and the latter abuts the adjacent shoulder 28, said sleeve underlying the inner surface of the conduit end, the concave portion of the sleeve abutting the inner surface of the arcuate portion 14 and being secured thereto as by brazing, soldering, or in any other suitable manner. When so mounted, the central portion 26 of the coupling member is flush throughout its outer surface with the outer surface 16 of each of the adjacent conduits, as illustrated in Fig. 4. In practice, each conduit section may be provided with a coupling 20 secured at the factory in one end thereof, so that when the conduit 12 is assembled it will be necessary to secure only one sleeve portion 24 into a conduit section for joining each pair of sections.

Another form of coupling 32 is illustrated in Figs. 5 and 6. As there shown, coupling 32 comprises the companion flange members 34, 34 with a gasket 36 therebetween, said flanges and gasket being mutually secured by the threaded bolts 38, each of which is provided with a nut 40. Each flange is non-circular in peripheral contour being provided with the concave portions 42, 42 which have substantially the same curvature as the outer surface portion 16 of the conduit, as illustrated in Fig. 5. Each flange is provided with a laterally extending portion 44 comprising a sleeve portion 46, similar to sleeve 24 and a raised portion 48, similar to raised portion 26. It will be noted that said portion 48 is peripherally continuous and when the coupling 32 is in position, each portion 48 is flush throughout its outer surface with the outer surface of the adjacent conduit. Each flange member 34 is provided also with a shoulder or step 50 which abuts the end of the conduit to limit the insertion of the coupling member therein. To mount the coupling, each sleeve 46 is inserted in the adjacent conduit end, the concave portion of the sleeve abutting the inner surface of arcuate portion 14 and secured thereto in a suitable manner. The gasket is interposed between the confronting faces of the flanges which are then secured together by bolts 38 and nuts 40. In practice, each section of conduit may be provided with a flange member 34 already secured to one end thereof in the described manner, so that at the place of installation, it will be necessary only to insert the gasket between companion flanges and then bolt them together.

While I have shown and described the presently preferred embodiment of my invention, it will be understood that various changes in the details of construction and in the form and arrangement of parts may be made without departing from the underlying idea or principles of this invention within the scope of the appended claims. It will be understood that the heat exchange medium referred to in the appended claims may be either a heating or a cooling medium.

Having thus described my invention, what I claim and desire to secure by Letters Patent is:

1. A conduit adapted to be placed in juxtaposition to a circular companion pipe laterally of the latter in surface-to-surface relation therewith, said conduit having a longitudinally extending re-entrant peripheral surface portion forming a recess to receive a longitudinally extending peripheral surface portion of the companion circular pipe, said re-entrant surface portion being cylindrically concave for contacting a cylindrical surface portion of the companion pipe, said conduit and said pipe being conterminous and adjacent to each other to effect a direct heat exchange therebetween through said portions for the length of said conduit and said pipe, said conduit comprising a plurality of conduit lengths, the latter having provisions to be joined in end-to-end relation.

2. A conduit adapted to be placed in juxtaposition to a circular companion pipe laterally of the latter in surface-to-surface relation therewith, said conduit having a longitudinally extending re-entrant peripheral surface portion forming a recess to receive a longitudinally extending peripheral surface portion of the companion circular pipe, said re-entrant surface portion being cylindrically concave for contacting a cylindrical surface portion of the companion pipe, said conduit and said pipe being conterminous and adjacent to each other to effect a direct heat exchange therebetween through said portions for the length of said conduit and said pipe, said conduit comprising a plurality of conduit lengths, the latter having provisions to be joined in end-to-end relation, and coupling means for interconnecting said conduit lengths, said coupling means comprising a coupling member positionable in each of the adjacent ends of a pair of said conduit lengths, said coupling member having a sleeve portion having the same cross-sectional outline as said conduit lengths and insertably engaged in one of said adjacent ends and a flanged portion extending laterally thereof, said flanged portion having a portion flush with said re-entrant surface portion and positionable in direct heat exchange relation with said companion pipe, and means for releasably securing said flange portions in confronting disposition.

3. A conduit adapted to be placed in juxtaposition to a circular companion pipe laterally of the latter in surface-to-surface relation therewith, said conduit having a longitudinally extending re-entrant peripheral surface portion forming a recess to receive a longitudinally extending peripheral surface portion of the companion circular pipe, said re-entrant surface portion being cylindrically concave for contacting a cylindrical surface portion of the companion pipe, said conduit and said pipe being conterminous and adjacent to each other to effect a direct heat exchange therebetween through said portions for the length of said conduit and said pipe, said conduit comprising a plurality of conduit lengths, the latter having provisions to be joined in end-to-end relation, and coupling means for interconnecting said conduit lengths, said coupling means comprising a coupling member having sleeve portions having the same cross-sectional outline as said conduit lengths, each of said sleeve portions being insertably engageable in one of the adjacent ends of a pair of said conduit lengths, and a raised portion between said sleeve portions in abutment with the confronting marginal portions of said adjacent ends, said raised portion having the same cross-sectional outline as said conduit lengths and being continuously flush therewith.

THOMAS A. COLLITO.

References Cited in the file of this patent

UNITED STATES PATENTS

| Number | Name | Date |
|---|---|---|
| 435,193 | Steele | Aug. 26, 1890 |
| 566,243 | Svagrovsky | Aug. 18, 1896 |
| 1,098,476 | Carpenter | June 2, 1914 |
| 1,188,485 | Pruyn | June 27, 1916 |
| 1,298,258 | Richards | Mar. 25, 1919 |
| 1,339,739 | Coleman | May 11, 1920 |
| 1,815,840 | Frank | July 21, 1931 |
| 1,925,032 | Dunner | Aug. 29, 1933 |
| 2,035,341 | Radloff | Mar. 24, 1936 |
| 2,151,206 | Hawthorne | Mar. 21, 1939 |
| 2,340,926 | Bradley | Feb. 8, 1944 |